United States Patent

Ishii

[15] 3,646,812
[45] Mar. 7, 1972

[54] APPARATUS AND METHOD FOR AUTOMATIC QUANTITATIVE ANALYSIS OF SUBSTANCES BY SLIGHT ENTHALPIMETRIC DIFFERENCE

[72] Inventor: Teruji Ishii, 26-2, Totsukamachi, Shinjuku-ku, Tokyo, Japan

[22] Filed: Aug. 8, 1969

[21] Appl. No.: 848,473

[30] Foreign Application Priority Data

Aug. 26, 1968 Japan......................43/61002

[52] U.S. Cl. ..........................................73/190 R
[51] Int. Cl. .....................................G01k 17/08
[58] Field of Search ............23/230, 252, 253; 73/190

[56] References Cited

OTHER PUBLICATIONS

Sturtevant, " Mixing Devices" in Weessberger Physical Methods Part I Vol. 1 page 624, 625 Interscience Publishing Inc. 1959

Benson et al., " Adiabatic Solution Culorimeter" in The Review of Scientific Instruments Vol. 27 No. 9 Sept. 1956

Maggs et al., " Recording Culorimeter for the Measurement of Heats of Wetting, Mixing or Solution" in Journal of Scientific Instruments Vol. 37 Feb. 1960 p. 60– 65

*Primary Examiner*—Richard C. Queisser
*Assistant Examiner*—Herbert Goldstein
*Attorney*—Robert E. Burns and Emmanuel J. Lobato

[57] ABSTRACT

This invention relates to an apparatus and method for quantitatively analyzing a test sample based on an enthalpogram obtained by automatic recording wherein the test sample and an additive solution, such as a dissolving, diluting or reacting solution, are brought to the same temperature and then rapidly mixed to give rise to such dissolving, diluting and reacting heat respectively and the slight temperature changes be caught as said enthalpogram in an adiabatic system.

9 Claims, 8 Drawing Figures

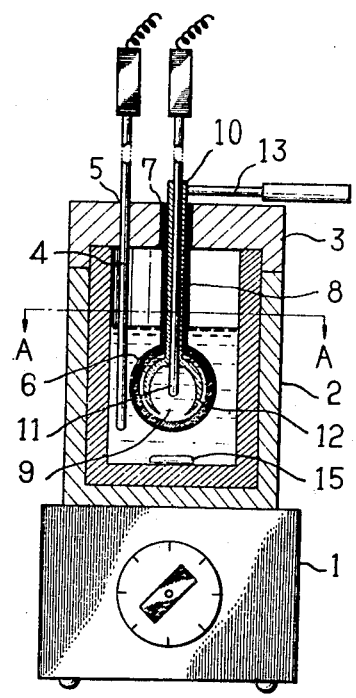
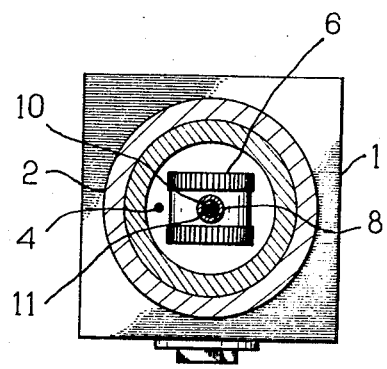
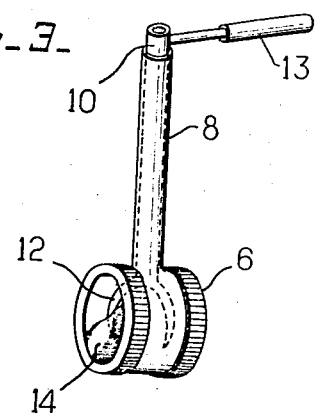
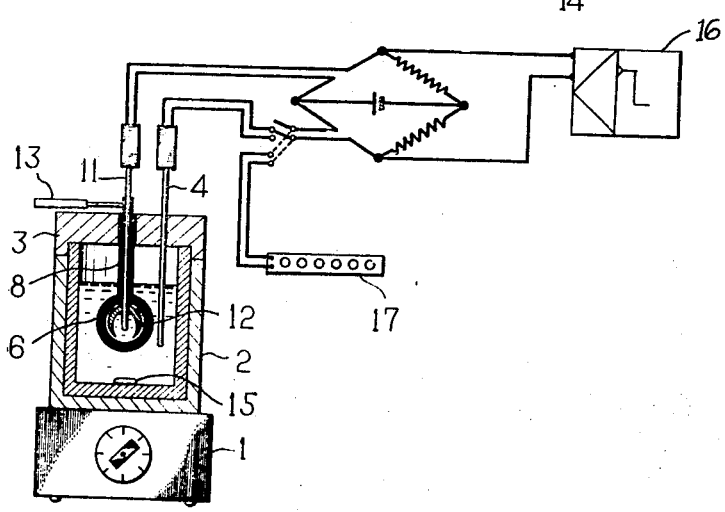

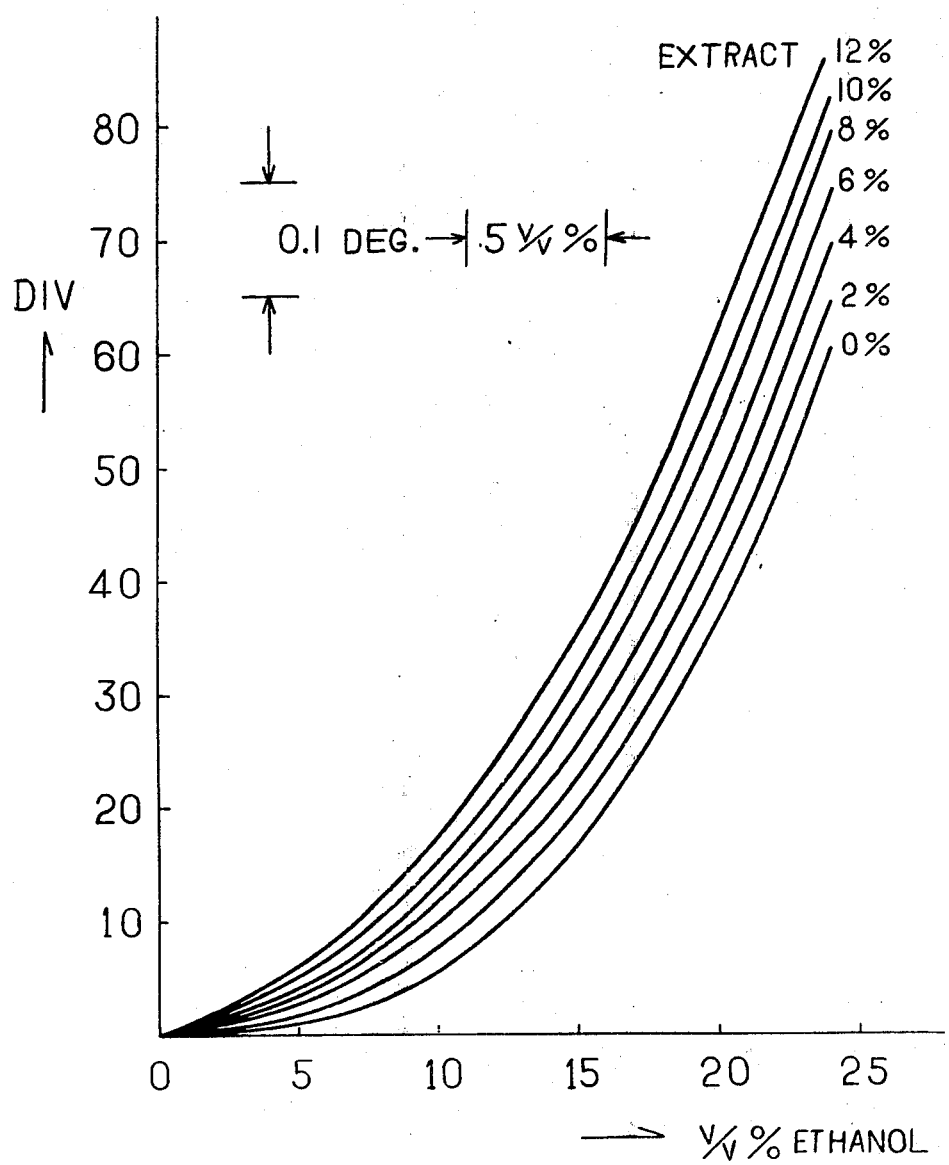

Fig-6-
ENTHALPOGRAMS OF "SAKE"
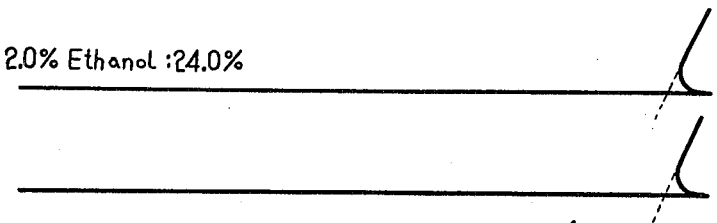
Extract: 2.0% Ethanol: 24.0%
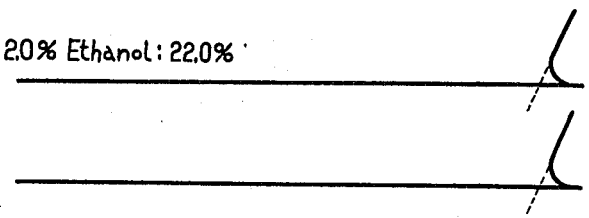
Extract: 2.0% Ethanol: 22.0%
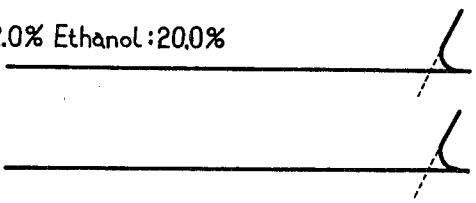
Extract: 2.0% Ethanol: 20.0%
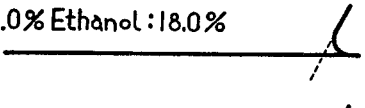
Extract: 2.0% Ethanol: 18.0%
Sample : 25 mL
Water : 10 mL
Room temp: 20 °C
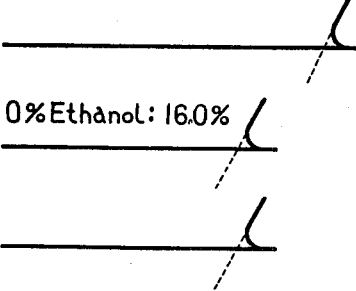
Extract: 2.0% Ethanol: 16.0%
dir  0   10   20   30   40   50   60   70   80

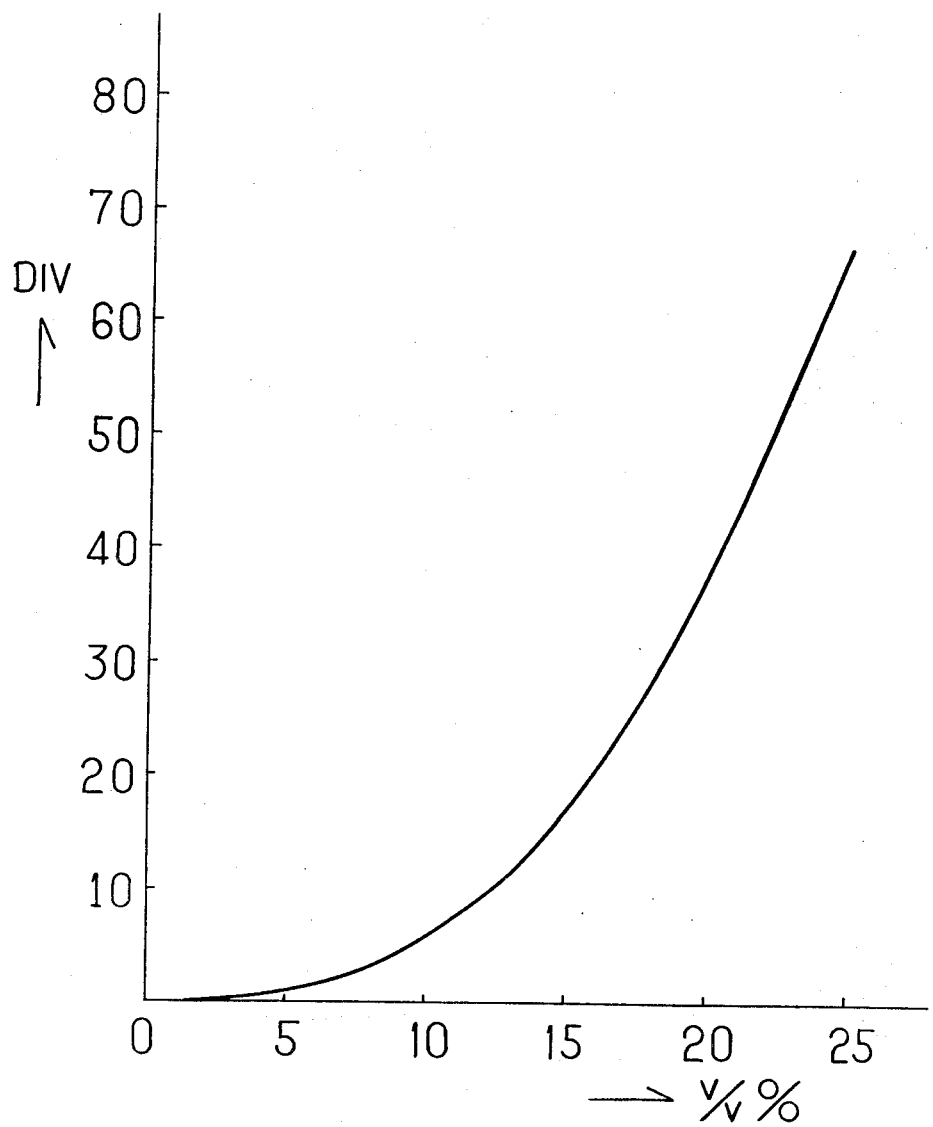
*Fig-7-*
CALIBRATION CURVES OF ETHANOL IN WHISKY

Fig-8-
ENTHALPOGRAM OF WHISKY
2X dilute Solution
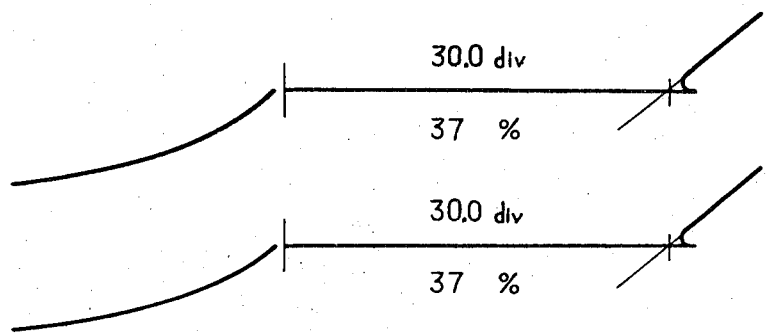
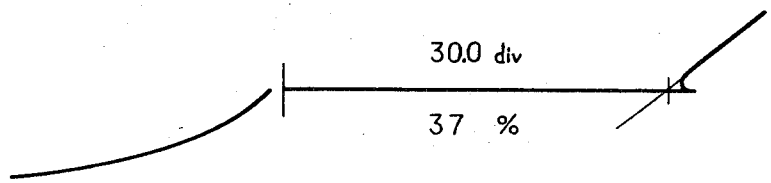
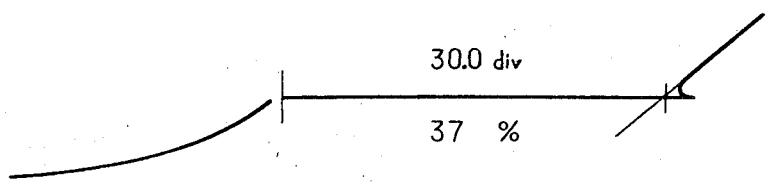

APPARATUS AND METHOD FOR AUTOMATIC QUANTITATIVE ANALYSIS OF SUBSTANCES BY SLIGHT ENTHALPIMETRIC DIFFERENCE

BACKGROUND OF THE INVENTION

For quantitative analysis of alcoholic content in alcoholic drinks and medicines and cosmetics containing alcohol, it has heretofore been customary to use distilling means or the method of measuring the specific gravity, but all these procedures have been difficult to carry out in operation, requiring both long period of time and a suitable floor space for experimental activities.

To make the matter worse, there have been individual differences in observation of measured accuracies and moreover, these procedures have required large amounts of samples to be tested and entailed complicated operation as removal of impurities from the test sample by previous treatment such as by distillation. Therefore, insofar as these procedures are employed, it has been found rather difficult to be free from all such drawbacks as mentioned above.

In view of these unfavorable factors, the present invention comprises an apparatus for automatically analyzing test samples quantitatively by means of slight changes in temperature by enthalpimetry, which is capable of eliminating the above-mentioned drawbacks, and obtaining enthalpograms which can be recorded automatically by simple means in only a few minutes without individual differences in observation of the measured results, and are found to assure good reproducibility thereof.

BRIEF SUMMARY OF THE INVENTION

It is an object of the present invention to provide an apparatus and method for analyzing test samples from entholpograms automatically obtained by mixing the test sample and a dissolving, diluting or reacting solution at the same temperature in an instant to produce such dissolved, diluted or reacted heat which are generated or absorbed at the instant of such mixing procedure as mentioned above, thereby catching only the slight changes themselves in temperature in an adiabatic system to appear in the form of the above-mentioned automatically recorded enthalpograms.

In order to achieve the aforegoing object, the present invention has an instant mixing apparatus consisting of an adiabatic container provided with a thermistor thermometer and a stirring means and containing a known volume of a sample solution whose constituents are known and whose concentration is to be determined and another drum-shape small container formed with both sides of an easily breakable foil wall, containing a reference solution whose constituents are known and being provided with a thermistor thermometer and a blade rotor capable of breaking the above-mentioned foil wall for insertion into the adiabatic container, and an apparatus for recording slight changes in temperature including respective resistors for connection to the thermistor thermometer in the adiabatic container and that in the small drum-shaped container. In the automatic quantitative analytic apparatus thus provided by the present invention, it is so arranged as to measure the temperatures of both solutions in the adiabatic container and the small drum-shaped container by their respective thermistor thermometers with high accuracy, so that just when the difference in temperature between both solutions has reached nearest to 0° C., these solutions are caused to mix together in an instant by breaking both foil walls and then only the slight changes in temperature can be recorded as enthalpograms by the above-mentioned apparatus for recording slight changes in temperature, thereby assessing the test sample quantitatively from the enthalpograms obtained as mentioned above.

In further detail, the above-mentioned apparatus of the present invention helps perform a quantitative procedure of the test sample on the basis of slight enthalpimetric differences in the following manner. Namely, the test solution to be quantitatively assayed is put into the adiabatic container provided with a thermistor thermometer and stirring means and the test solution is kept under the stirred conditions on one hand. On the other hand, there is provided a small drum-shape metering container provided with a thermistor thermometer and formed with both sidewalls of breakable foil with good heat conductivity and also provided with a blade rotor capable of being rotated by means of an operating lever therein, and then a solution is put into the drum-shaped container for being mixed with the solution in the adiabatic container by breaking the thin walls of foil. When both these containers are thus provided, the drum-shaped container is suspended in the adiabatic one so that, when the difference in temperature between both solutions has come nearest to 0° C. while measuring the temperatures by their respective thermistor thermometers inserted therein, the blade rotor in the drum-shaped container is caused to work by means of the above-mentioned operating lever to break both sidewalls of foil in an instant, thereby permitting the instant mixing of both solutions. Naturally at this instant, there occurs an exothermic or endothermic diluting, dissolving or reacting heat, on the basis of which only the slight changes in temperature are recorded automatically as enthalpograms on a chart and then, it is rendered possible to measure the concentration of the test solution from the extend of amplitude with reference to a curve of calibration previously made from a reference substance of a known concentration.

BRIEF DESCRIPTION OF THE DRAWING

FIG. 1 is a view in vertical section of an embodiment of apparatus for dissolving, diluting and reacting purposes by mixing a test solution and another additive solution in an instant.

FIG. 2 is a view of the same, taken along the line A—A of FIG. 1.

FIG. 3 is a perspective view of a small drum-shape container, showing the breakage of one-side aluminum foil wall in part.

FIG. 4 is a circuit for measuring purposes of an automatic quantitative analytic apparatus by slight enthalpimetric differences according to the present invention.

FIG. 5 shows a curve of calibration of ethanol contained in a Japanese alcoholic drink after quantitative analysis according to the present invention.

FIG. 6 shows an enthalpogram of a Japanese alcoholic drink.

FIG. 7 is a curve of calibration of ethanol contained in whisky.

FIG. 8 is an enthalpogram of whisky.

The invention will be explained in detail with reference to the accompanying drawings.

There is provided an adiabatic container 2 with a lid 3 above a magnetic stirrer 1. In the lid 3 are formed an insert hole 5 for a temperature sensor comprising a thermistor thermometer 4 and another insert hole 7 for a small drum-shaped metering container 6 which is arranged to be suspended in a test solution in the adiabatic container. This small drum-shaped container 6 consists of a hollow tubular member 8 and a small chamber 9 built of a metal disc with good heat conductivity, and a cylindrical shaft core 10 extends through the hollow tubular member 8 and is mounted and to rotate freely in a horizontal direction. The hollow portion 8 comprises mounting means for mounting the metering container interiorly of the adiabatic container.

The cylindrical shaft core 10 is designed in construction such that another temperature sensor comprising a thermistor thermometer 11 can be inserted therein. Rupturing means comprising an arc rotary blade 12 is provided at the lower end of the cylindrical shaft core 10, wherein the portion of the blade 12 is positioned in the drum-shaped small chamber 9. An operating lever 13 is secured to the top end of the cylindrical shaft core 10 so that the latter can be moved at will.

The construction of the metallic disc-shaped small chamber 9 with good heat conductivity in the drum-shaped container 6 will be explained hereinafter. Both internal edges of this small chamber 9 are threaded and threaded rings are detachably mounted on the respective ones of the internal edges as mentioned above.

A circular aluminum foil 14 is secured to each ring through the interposition of a packing and the above-mentioned arc-shaped rotatable blade 12 is positioned between these two rings so that the blade at the lower end of the cylindrical shaft core 10 can be rotated freely by means of the operating lever 13 provided at the top end of the cylindrical shaft core 10, as has already been referred to.

By hanging the drum-shaped metering container 6 in the adiabatic container 2 (see FIG. 1), it is possible to mix the test solution and the other additive solution in an instant in case of need.

A stirrer is indicated at reference numeral 15 and preferably is in the form of a disc thereby assuring excellent stirring efficiency. The thermistor thermometer 4 is inserted in the adiabatic container 2 and the other thermistor thermometer 11 inserted in the drum-shaped container 6 are connected to an electric circuit and signal developed by the respective thermistors are compared to determine when the temperature within the adiabatic container is substantially equal to the temperature within the metering container. During operation of the apparatus, the output signals from the thermistors are applied to a recorder 16 for recording slight changes in temperature through their respective circuits and moreover, the thermistor thermometer 4, when necessary, can be switched to a variable resistor 17.

The characteristics of construction of the present apparatus are so devised as to mix a test solution and an additive solution for causing such dissolving, diluting and reacting heat capacity whereby only the slight changes in temperature can be caught very sensitively in an instant and recorded as enthalpograms in the following manner.

Namely, (1) in order to make the difference in temperature approximately 0° C. between the test or sample solution and the reference additive solution before measurement, two thermistor thermometers with extremely high accuracy and almost equal features are used. (2) In order to obtain instant mixing of the additive solution in the drum-shaped container into the test solution, the small chamber of the drum-shaped container is formed into a disc shape and moreover, a thin wall of aluminum foil is formed on both sides thereof and an arclike blade is disposed in the small chamber so that it can be rotated by means of the operating lever to break both sides of aluminum foil thereby enabling all the additive solution in the drum-shaped container to mix into the test solution. (3) In order to assure an excellent stirring of the resulting solution, the stirring rotor is formed into a disc shape instead of conical form as has been customary heretofore and stirring blades extending in radial directions are formed on the surface of the stirring rotor, the rotor being made solid with the stirring blades in design and the bottom of the rotor is formed into an upside down conical shape having an obtuse top angle. In this way, it is possible to make the difference in temperature nearest to 0°C. between the test solution and the additive one with high accuracy so that only the slight changes in temperature at the instant of mixing procedure can be caught by sensitization.

Now, a working example of ethanol quantitative analysis will be shown as an example.

First of all, 25 ml. of diluted ethanol of unknown concentrations is measured exactly and put into the adiabatic container 2. Then the metering container containing an exactly measured amount of 10 ml. of water is hung in the above-mentioned adiabatic container.

At this instant, while stirring the ethanol solution in the adiabatic container 2 by means of the disclike stirring rotor 15 without interruption, the temperatures of the ethanol and of water in the drum-shaped container are measured by the respective thermistor thermometers 4 and 11. When the difference in temperature between both solutions has shown up as 1/1,000 ° or when the temperatures within the two containers are substantially equal the thermistor thermometer 4 is inserted in the test solution of ethanol of unknown concentration is replaced by an equivalent resistance by means of six-dial variable resistor 17 and then the pen of the recorder 16, used for recording slight changes in temperature, is brought to the standard line while adjusting the six-dial resistance value.

Subsequently, the operating lever 13 is rotated to move the arclike blade 12 disposed in the drum-shaped container 6, thereby breaking or rupturing both thin walls of aluminum foil 14 around the blade 12 in an instant and thus mixing the water and test solution of ethanol in contact with both thin walls of aluminum foil 14. The diluting heat of ethanol occurring here can appear as enthalpograms on the chart associated with the recorder 16 so that a quantitative analysis of the test solution of ethanol can be easily performed from the extent of amplitude of such enthalpograms by comparing same with a reference curve of calibration which has been prepared using ethanol of already known concentrations. The reproducibility of such enthalpograms is ascertained to be ±0.5 division, which corresponds to 0.125 percent in percentage of ethanol.

By the way, the standard deflection of ethanol in this case is $\sigma = 0.08$ percent. Subsequently by using the apparatus of the present invention, it is possible to obtain the following effects.

a. The system of reaction goes on always under constant conditions of heat capacity, that is to say, a definite amount of test solution is mixed with a definite amount of additive solution so that high accuracy of measurement can be assured.

b. When mixing a test solution with an additive solution, an equilibrium of heat of all system can be obtained within 1/100 second, a very short period of time is sufficient for measuring purposes (only a few minutes).

c. Since an additive solution for mixing purposes can be used in excessive amounts, no such standardization is required as has been often necessary with titrating reagents heretofore.

d. In the case of magnified recording at the full scale of 1 degree of the recorder, it is possible to assay a solution or test solution in amounts of even 5/100–1/100 mol without the provision of any special equipment in an analyzing laboratory.

e. As it is possible to mix a test solution and an additive solution at the difference of 1/1,000 ° of temperature in an adiabatic container, the test sample of an extremely small specific gravity can be analyzed quantitatively with high accuracy.

f. A small amount of test sample is usable, giving no individual difference in observation of the measured results with good reproducibility.

g. No previous treatment of a test sample is necessary.

According to the method of the present invention, the measurement of alcohols is very simple and can be carried out very rapidly in only a few minutes as compared with conventional method, giving rise to no individual differences in observation but assuring good reproducbility of the measured values.

Moreover, it is possible to record the measured values automatically without requiring any specified floor space, thereby enabling such measured values to remain as useful data forever.

In addition, a small amount of test sample is sufficient to ensure its overall measurement. In the case of quantitative analysis of ethanol, for example, two quantitative analyses of ethanol part and its extract part can be carried out at a time.

The method of the present invention has a wide range of useful application and particularly in cases of alcoholic drinks, to begin with, alcoholic content of medicines and cosmetics can be identified quantively so that it is entitled to be very useful in the management of manufacture of such medicines and cosmetics and in the control of their qualities.

Furthermore, the present method can be used in carrying out a quantitative analysis of alcohol, methanol, isopropanol in addition to common alcoholic drinks or measurements associated with exothermic or endothermic phenomena. It is apparent that the present invention is not limited to all the

What is claimed is:

1. An apparatus for determining the concentration of a sample solution comprising: an adiabatic container receptive during use of the apparatus of a known volume of a sample solution composed of known constituents and whose concentrations is to be determined; a fluidtight metering container having a given volume and having at least two rupturable wall portions receptive during use of the apparatus of a reference solution whose constituents and concentration are known; mounting means mounting said metering container interiorly of said adiabatic container beneath the surface level of the sample solution; rupturing means for rupturing said two rupturable wall portions comprising a rotatably mounted shaft having one end extending interiorly of said metering container, at least two blade members connected to said one end each operative in response to rotation of said shaft to rupture one of said rupturable wall portions whereby the reference solution is allowed to mix with the sample solution, and means for effecting rotation of said shaft; stirrer means disposed within said adiabatic container for stirring together the reference and sample solutions; temperature sensing means for sensing the temperature within said adiabatic container and providing a corresponding output signal; and recording means responsive to said output signal for automatically recording curves on a record medium indicative of the temperature within said adiabatic container; whereby the record medium may be compared with reference curves to determine the relative concentration of the constituents of the sample solution.

2. An apparatus according to claim 1; wherein said metering container includes therein means defining two threaded circular openings; and wherein each of said rupturable wall portions comprises a threaded ring in releasable, threaded engagement with one of said threaded circular openings, and a rupturable sheet of heat-conductive material fluidtightly secured to said threaded ring.

3. An apparatus according to claim 1; including another temperature sensing means disposed within said metering container for sensing the temperature within said metering container and providing a corresponding output signal; and electric circuit means receptive of both said output signals for indicating when the respective temperatures within said adiabatic and metering containers are substantially equal.

4. An apparatus according to claim 3; wherein said mounting means includes an elongated tubular member interconnecting said metering and adiabatic containers, and wherein both said shaft and said another temperature sensing means extend interiorly of and coaxially with said tubular member.

5. An apparatus according to claim 3; wherein both said temperature sensing means comprise thermistors electrically connected to said electric circuit means.

6. An apparatus according to claim 3; wherein said metering container includes therein means defining two-threaded circular openings; and wherein each of said rupturable wall portions comprises a threaded ring in releasable, threaded engagement with one of said threaded circular openings, and a rupturable sheet of heat-conductive material fluidtightly secured to said threaded ring.

7. Apparatus according to claim 6; wherein said sheets of heat-conductive material comprises aluminum foil sheets.

8. A method of determining the concentration of a sample solution comprising: providing a sample solution composed of known constituents and whose volume is known and whose concentration is to be determined; adiabatically confining said sample solution in a measuring zone; providing a reference solution composed of known constituents whose volume and concentration are known; immersing said reference solution in said sample solution while preventing physical contact therebetween; allowing physical contact between said reference and sample solutions when the temperature of said reference solution substantially equals that of said sample solution; then immediately mixing together said reference and sample solutions while concurrently recording on a record medium a curve indicative of the temperature of the mixed together solutions; and comparing the recorded record medium with standard reference curves to determine the relative concentration of the constituents of said sample solution.

9. A method according to claim 8; wherein said immersing step comprises placing said reference solution in a rupturable container, and then immersing said rupturable container in said sample solution; and wherein said allowing step comprises contacting said rupturable container with a rotating cutting surface to effect rupturing of said rupturable container.

* * * * *